(12) United States Patent
Morey et al.

(10) Patent No.: US 10,831,511 B2
(45) Date of Patent: Nov. 10, 2020

(54) CUSTOMIZED APPLICATION PROGRAMMING INTERFACE PRESENTATION

(71) Applicant: ADP, LLC, Roseland, NJ (US)

(72) Inventors: John Morey, New York City, NY (US); Harrison Cross, Alpharetta, GA (US); Troy Kobek, Alpharetta, GA (US); Zachary Smith, Culver City, CA (US); Raymond Garrison, Alpharetta, GA (US); Gino Marotta, Alpharetta, GA (US); Mike Bowers, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 267 days.

(21) Appl. No.: 15/478,428

(22) Filed: Apr. 4, 2017

(65) Prior Publication Data

US 2018/0285365 A1    Oct. 4, 2018

(51) Int. Cl.
*G06F 9/451* (2018.01)
*G06F 8/36* (2018.01)

(52) U.S. Cl.
CPC ............... *G06F 9/451* (2018.02); *G06F 8/36* (2013.01)

(58) Field of Classification Search
CPC .......... G06F 9/451; G06F 8/36; G06F 16/283; G06Q 30/02; H04L 63/08
USPC ........................................ 707/730, 740, 769
See application file for complete search history.

(56) References Cited

U.S. PATENT DOCUMENTS

| | | | | |
|---|---|---|---|---|
| 6,839,680 B1* | 1/2005 | Liu | ..................... | G06Q 30/0204 705/7.33 |
| 8,494,929 B1* | 7/2013 | Borgen | ................ | G06Q 10/105 705/30 |
| 9,886,247 B2* | 2/2018 | Laredo | ................ | G06F 16/2455 |
| 2012/0095956 A1* | 4/2012 | Xiong | .................. | G06Q 10/067 707/600 |
| 2012/0323898 A1* | 12/2012 | Kumar | ............... | G06Q 30/0251 707/723 |
| 2014/0075574 A1* | 3/2014 | Zheng | ..................... | G06F 21/31 726/28 |
| 2014/0282097 A1* | 9/2014 | Edlund | ................ | G06Q 10/103 715/753 |
| 2015/0269377 A1* | 9/2015 | Gaddipati | ............... | G06F 21/44 726/30 |

(Continued)

OTHER PUBLICATIONS

Author: Nguyen et al., Title : A Graph-based Approach to API Usage Adaptation, Date: 2010, (Year: 2010), pp. 302-321.*

(Continued)

*Primary Examiner* — Md I Uddin
(74) *Attorney, Agent, or Firm* — Yee & Associates, P.C.

(57) ABSTRACT

Systems and methods are provided that list application programming interfaces (APIs). A categorization tag for each API in the list is generated. The categorization tag identifies functions provided by the API. A user profile associated with the user is determined. A plurality of categories of the APIs is displayed such that each category is based on a common element of each categorization tag, and aspects of the user profile. In response to a selection of one selected category in the plurality of categories, the list of APIs matching the selected category is displayed. The list is ordered such that APIs having a greater relevance score are presented at a top of the list.

24 Claims, 6 Drawing Sheets

(56) References Cited

U.S. PATENT DOCUMENTS

2016/0358117 A1* 12/2016 Herrin .............. G06Q 10/06311
2017/0277756 A1*  9/2017 Masuda ................ G06F 9/5072

OTHER PUBLICATIONS

Doerrfeld, "API Discovery: 11+ Ways to Find APIs," Aug. 4, 2015, Nordic APIs AB, 15 pages. (http://nordicapis.com/api-discovery-11-ways-to-find-apis/).
Stylos et al., "Mica: A Web-Search Tool for Finding API Components and Examples," 2006, IEEE, 8 pages.

* cited by examiner

CUSTOMIZED APPLICATION PROGRAMMING INTERFACE PRESENTATION

BACKGROUND INFORMATION

1. Field

The present disclosure relates generally to systems and methods for improving speed and accuracy of computers when generating a list of application programming interfaces.

2. Background

A typical software application comprises several modules that work with one another. Each module provides a different functionality. An application programming interface (API) exposes the functionality encapsulated within a module to other modules so that the modules can communicate with one another. Accordingly, the module for providing a specific function can be implemented once and shared with the other modules for different applications.

For example, a web designer creating a web-based timekeeping application may need to access employee timekeeping records, which is provided by one of several timekeeping modules. Each timekeeping module has an associated API that returns the timekeeping records. The APIs for these modules are often listed in a repository. However, searching for a proper and fitting API from the multitude of APIs in the API repository may be overwhelming and take more time than desired, thereby leading to user frustration and delay.

Therefore, it would be desirable to have a method and apparatus that take into account at least some of the issues discussed above, as well as other possible issues. For example, it would be desirable to have a method and apparatus that overcome a technical problem of presenting relevant APIs.

SUMMARY

An embodiment of the present disclosure provides a computer-implemented method of improving speed of generating a list of application programming interfaces (APIs) using a processor. The method comprises generating a categorization tag for each API in the list. The categorization tag identifies functions provided by the API. The method includes the step of determining a user profile associated with the user. The method includes the step of displaying a plurality of categories of the APIs such that each category is based on a common element of each categorization tag and aspects of the user profile. In response to a selection of one selected category in the plurality of categories, the method includes displaying the list of APIs matching the selected category. The list is ordered such that APIs having a greater relevance score are presented at a top of the list.

Another embodiment of the present disclosure provides a system for listing application programming interfaces (APIs). The system comprises a processor configured such that, in operation, the processor executes code to implement a login manager that retrieves a user profile associated with a user. The processor also implements a data processing component configured to generate a categorization tag for each API in a list of APIs. The categorization tag identifies functions provided by the API. A plurality of categories of the APIs is displayed such that each category is based on a common element of each categorization tag and aspects of the user profile. A selection of one selected category in the plurality of categories is detected. In response to a selection of one selected category in the plurality of categories, the method includes displaying the list of APIs matching the selected category. The list is ordered such that APIs having a greater relevance score are presented at a top of the list.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
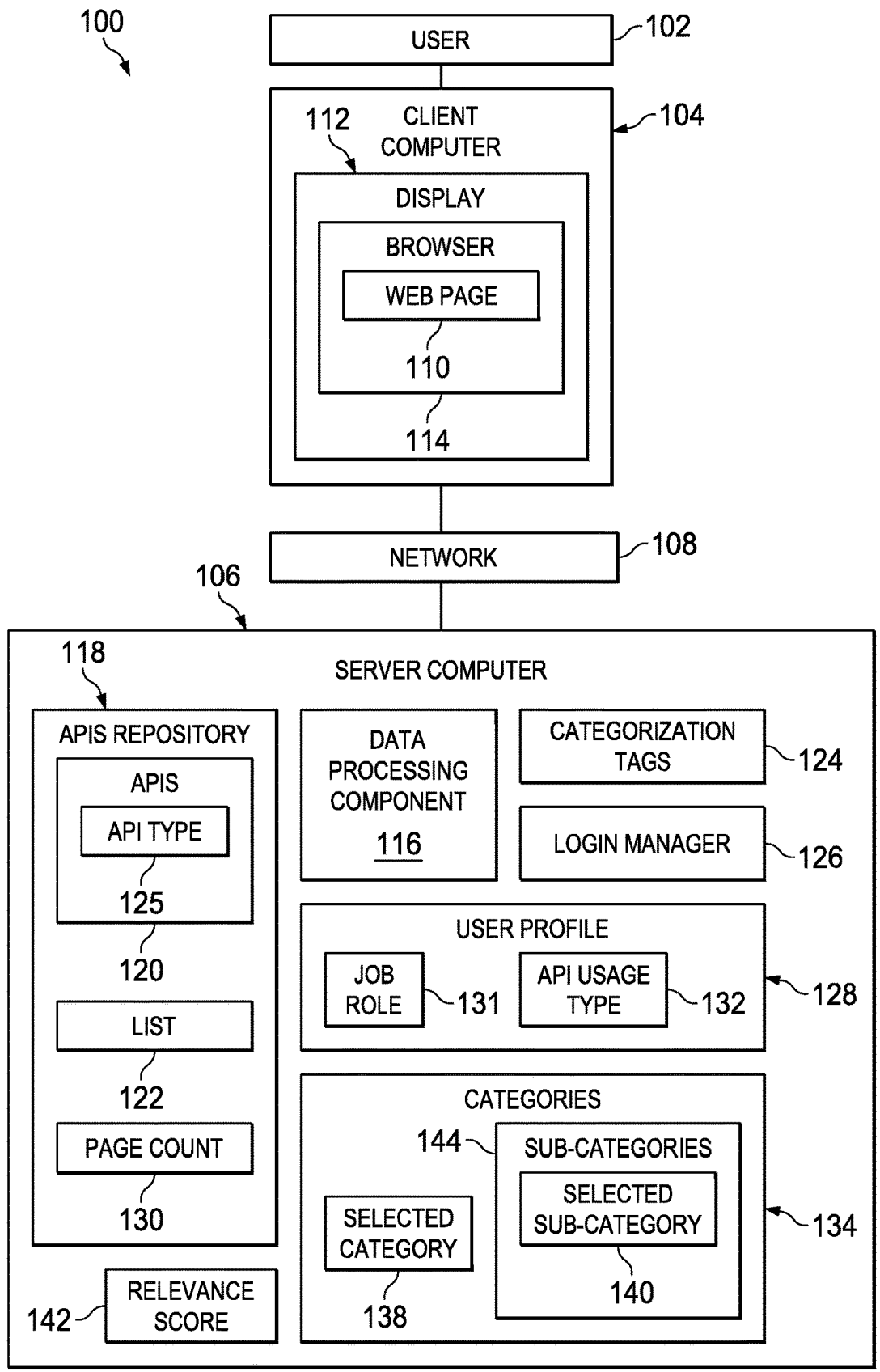
FIG. 1 is an illustration of a block diagram of a software development environment depicted in accordance with an illustrative embodiment.

The illustrative embodiments recognize and take into account one or more different considerations. For example, the illustrative embodiments recognize and take into account that a web application may be developed using several underlying modules. Each module has an application-programming interface (API) that allows the module to communicate with other modules. The available APIs are stored in a repository.

The illustrative embodiments recognize and take into account that a multitude of APIs stored in the API repository can be overwhelming to a user. Current systems do not present information related to APIs in an organized manner. The illustrative embodiments dynamically display the APIs that are relevant to the user. The illustrative embodiments categorize the APIs and display categories based on the type of API and information about the user. The illustrative embodiments categorize the APIs to provide a visual indication to guide the user to relevant APIs. The illustrative embodiments use tracking information to determine which of the APIs are relevant to the user based on a profile of the user. The illustrative embodiments track the APIs that are selected by the user as well as other users having similar user profiles. In this manner, the illustrative embodiments filter out noise (e.g., remove the APIs that are unlikely to be relevant) and provide a varying level of granularity for different categories in a list of the APIs.

The illustrative embodiments generate a categorization tag for each API in the list of the APIs and determine a user profile associated with the user. The illustrative embodiments generate a plurality of categories of the APIs based on elements of each categorization tag and aspects of the user profile. In response to a selection of one category, the APIs having a greater relevance score are presented at a top of the list.

The illustrative embodiments improve speed and accuracy of a computer or computers processing user queries for the list of the APIs. The speed of the computer or computers increases because the processor can operate more efficiently by only storing and listing the APIs that are relevant to the user. The speed of the processor increases because the processor has fewer APIs to list.

The illustrative embodiments use rules of a particular type to select the relevant APIs to list based on characteristics of the user. The illustrative embodiments herein are an improvement in computer technology specifically to advance the state of the art of displaying and sorting. The embodiments provide for faster search times, smaller memory requirements, faster page load times, and increased flexibility in listing and determining which of the APIs are relevant to the user.

The illustrative embodiments address the problem of retaining website visitors that, if adhering to routine and conventional methods of displaying the APIs, would overwhelm the user. Searching for the relevant APIs is the problem rooted in computer technology. The illustrative embodiments address problems discussed above in a non-conventional way to override the routine ways of listing the APIs by listing the APIs that are tailored to a user's specific needs, to solve a specific problem on the Internet of having too much irrelevant information.

A technical advantage of the embodiments herein includes a reduced time in finding the APIs. Another technical advantage of the embodiments herein includes an improvement in the efficiency in operating a computer. Yet another technical advantage of the embodiments herein includes an increase in search speed. Still another technical advantage of the embodiments herein includes a reduction in the required skill of the user in finding and implementing the API.

FIG. 1 is an illustration of a block diagram of a software development environment depicted in accordance with an illustrative embodiment. FIG. 1 shows use of one development environment in order to show a context of the illustrative embodiments. Development environment 100 includes user 102 using client computer 104 in communication with server computer 106. The illustrative arrangement is a client/server model for development of a web application.

Client computer 104 and server computer 106 may be any data processing system such as a mobile computer, a phone, a tablet, and the like. Either client computer 104 or server computer 106 may be data processing system 600 as shown later in FIG. 6. Client computer 104 and server computer 106 are connected to one another via network 108. Network 108 may be the Internet, a local area network, a wireless network, or any suitable data network.

User 102 accesses web page 110, shown on display 112 of client computer 104, via browser 114. Browser 114 displays web page 110 according to instructions of software on client memory as executed by a client processor. Client computer 104 may include other components, such as a user input device, in addition to the display 112.

Server computer 106 serves information for displaying in web page 110. Data processing component 116 executes on server computer 106 and processes the information to send to client computer 104. For example, data processing component 116 may comprise a web server and a database.

Server computer 106 includes API repository 118. API repository 118 comprises list 122 of APIs 120 and may also include a collection of APIs 120. For example, API repository 118 may be the database. List 122 may be a record of APIs 120 in the database.

APIs 120, as used herein, represent a software construct that provides an interface between different software components. APIs 120 are a software-to-software interface. APIs 120 may be a set of tools, protocols, or routines for exchanging information between the software components. For example, APIs 120 may be a Javascript® Object Notation (JSON) formatted API that specifies how information requests for a web application are fetched or modified, and how server computer 106 should respond to these requests. APIs 120 have different types. In the example above, APIs 120 may be a REST type API having GET, POST, PUT, and DELETE functions. As another example, APIs 120 may be an object-oriented type API having the information for exchanging data structures.

Data processing component 116 generates categorization tags 124 for APIs 120 in list 122. Data processing component 116 may generate and store an individual categorization tag for APIs 120 in list 122. For example, categorization tags 124 may be embodied as a record in a database.

Categorization tags 124 describe API type 125 and the functions provided by APIs 120. API type 125 indicates an intended use for APIs 120. The functions may comprise an event, a value, a text string, a data structure, or any other type of data returned by APIs 120. For example, categorization tags 124 may identify an API as a REST type API that provides an event notification message. As another example, categorization tags 124 may identify an API as the REST type API that provides time-off information for a worker. As another example, categorization tags 124 may return information about a time-off request for the worker.

Server computer 106 includes login manager 126. Login manager 126 stores user profile 128 associated with user 102. For example, login manager 126 may be invoked with user logins into server computer 106 via browser 114. User profile 128 may include information about user 102, such as a username, login credentials (e.g., a password), and other information that identifies user 102.

User profile 128 comprises job role 131. Job role 131 describes a type of application that user 102 is developing. For example, job role 131 may indicate a role for which the application is developed. For example, job role 131 may indicate one or more of a marketing application, a timekeeping application, an accounting application, or any other type of web-based application.

User profile 128 comprises API usage type 132. API usage type 132 is a record of API type 125 that user 102 has previously used. For example, API usage type 132 may be an indication of a previous API type or a favorite API type.

Categorization tags 124 are dynamically updated based on user usage and association. Categorization tags 124 record user profile 128 to track information about user 102 and API type 125. Categorization tags 124 create an association between aspects of user profile 128 and APIs 120. For example, categorization tags 124 may record job role 131 of one or more users to identify a trend in a type of job role 131 that users have.

Data processing component 116 sends information from server computer 106 to client computer 104 to display a plurality of categories 134 on web page 110. Categories 134 represent an assortment of APIs 120 in different bins such that APIs 120 having common elements are placed in common bins. Categories 134 may be based on API type 125. For example, categories 134 may be one or more of time, tax, staffing, core, human resources, talent, payroll, and benefits. In other words, APIs 120 having common elements are grouped into categories 134. Categories 134 may be further categorized into one or more of sub-categories 144, such that each of sub-categories 144 is a subset of APIs 120 in a common category. In this manner, categories 134 and sub-categories 144 form a hierarchy that progressively segregates APIs 120 according to API type 125 into increasingly more closely associated bins.

In an illustrative example, categorization tags 124 may simultaneously associate APIs 120 with multiple ones of categories 134 and sub-categories 144 within the hierarchy of categories 134 at any given time. For example, an API may belong to a top-level category 134 in the hierarchy, sub-categories 144 within the top-level category 134, and also a sub-subcategory within sub-categories 144.

In response to a selection of selected category 138, data processing component 116 displays list 122 of APIs 120. List 122 is ordered to show more relevant ones of APIs 120 at a top of list 122. List 122 is sorted such that APIs 120 having a greater relevance score 142 are presented before other ones of APIs 120.

Relevance score 142 is calculated based on user profile 128. The elements of user profile 128 may be weighted such that more relevant elements are given a greater weight. For example, job role 131 may have a greater weight than API usage type 132. Relevance score 142 may also be based on a page count. For example, an API having a greater page count 130 may be listed above an API having a lesser page count 130. Page count 130 may be incremented every time user 102 visits a web page directed to a particular API, as shown later in FIG. 4. Optionally, an API usage count may be incremented when user 102 implements an API. API implementation (e.g., actual usage) may be tracked by an internal mechanism in the API.

Optionally, in response to the selection of selected category 138, data processing component 116 displays a set of sub-categories 144 that are a subset of selected category 138. For example, selected category 138 may comprise a broad categorization of API type 125. Sub-categories 144 may be a sub-set of API type 125. For example, selected category 138 may be a timekeeping category. Sub-categories 144 may be categories related to timekeeping such as time off requests, time entry, and time notification. Upon selection of a selected sub-category 140 in sub-categories 144, at least one of list 122 and a further subset of sub-category 140 (e.g., a sub-subcategory) may then be displayed as described above.

In an illustrative example, data processing component 116 determines which of categories 134 and sub-categories 144 to display APIs 120 based in part on user profile 128. For example, based on user profile 128 for a first user, data processing component 116 may determine to display a particular API in a top-level category 134 in a hierarchy of categories 134. However, data processing component 116 may determine to display that same API in sub-categories 144 of the hierarchy based on user profile 128 for a second user. Still further, data processing component 116 may determine to display that same API in a sub-category of sub-categories 144 (e.g., a sub-subcategory) of the hierarchy based on user profile 128 for a third user. In this manner, APIs 120 are categorized and displayed according to user profile 128. By driving category level display of APIs 120 according to user profile 128, data processing component 116 facilitates a rendition of list 122 that is specifically tailored to a particular user.

Figure 2:
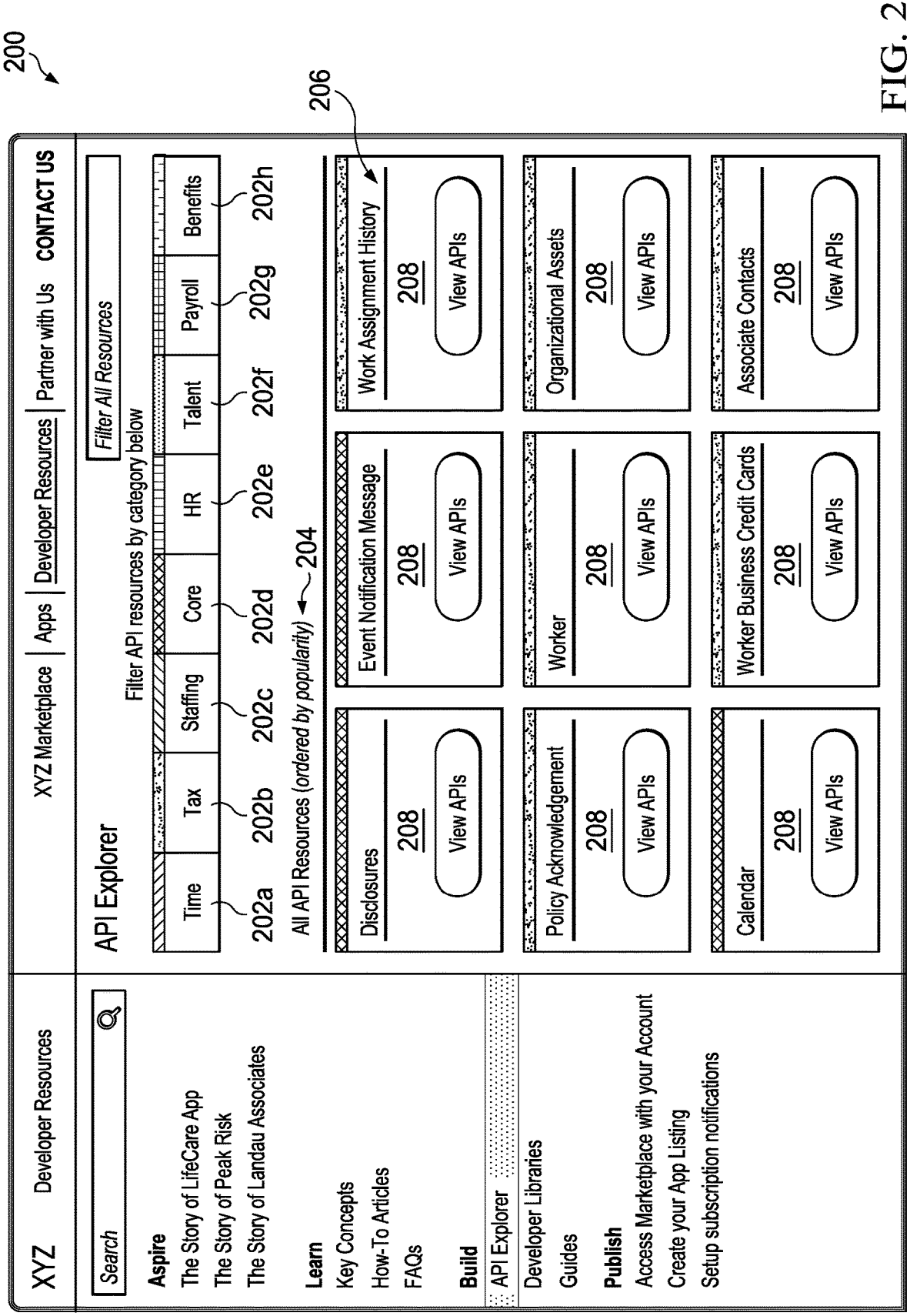
FIG. 2 is an illustration of a web page depicted in accordance with an illustrative embodiment.
Figure 3:
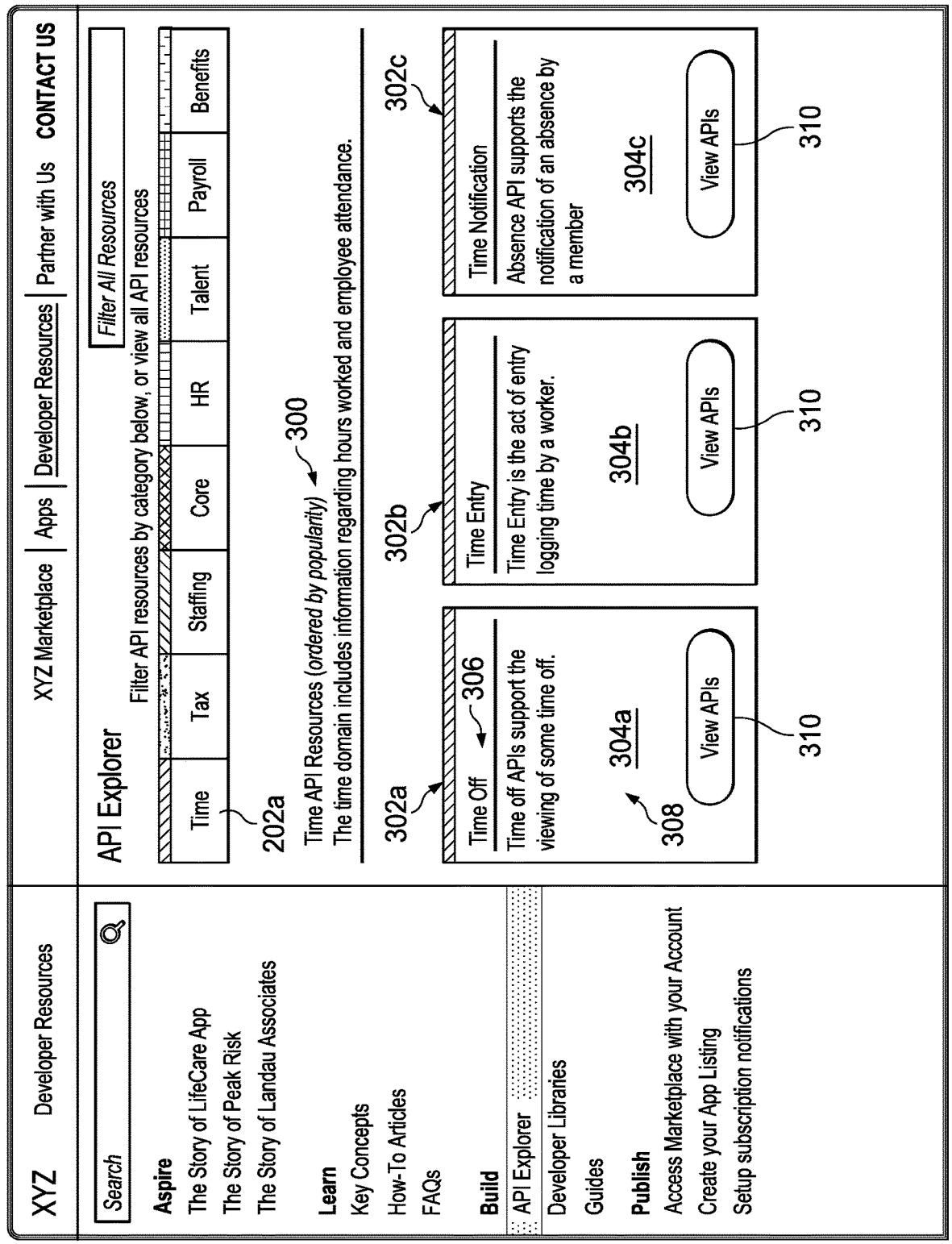
FIG. 3 is another illustration of a web page depicted in accordance with an illustrative embodiment.
Figure 4:
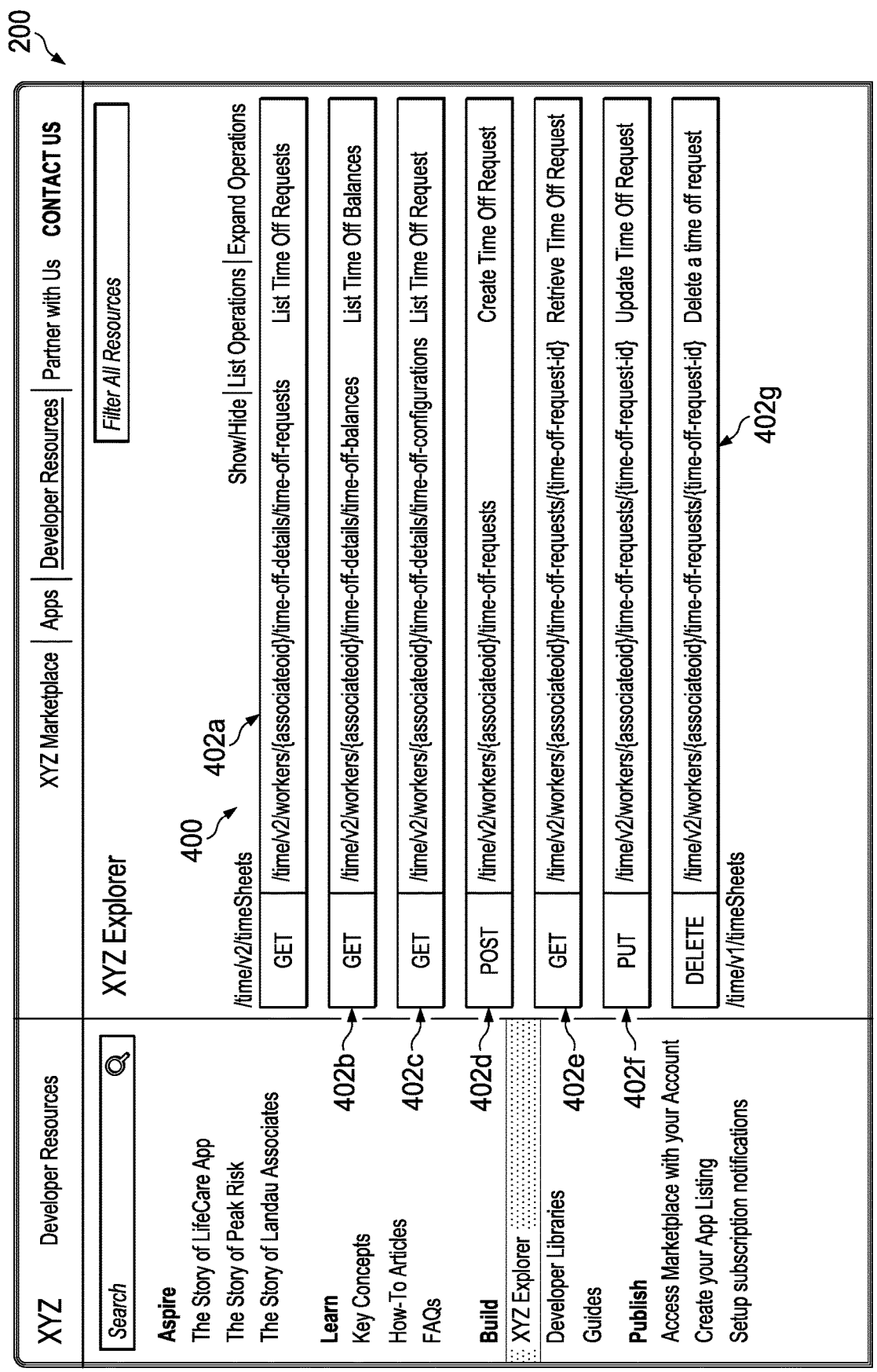
FIG. 4 is yet another illustration of a web page depicted in accordance with an illustrative embodiment.

The illustrative embodiments are directed toward a generation and a display of web page 110 and, in particular, are directed toward categorizing APIs 120. The categorization and sort of APIs 120 allows for a fewer number of APIs 120 (e.g., only relevant APIs) to be transmitted across network 108, thus reducing the amount of bandwidth and increasing the speed of client computer 104. FIGS. 2-4 describe particular uses or designs of a web page and its use.

FIG. 2 is an illustration of a web page depicted in accordance with an illustrative embodiment. In the depicted example, web page 200 is an example of web page 110 shown in FIG. 1. In this illustrated example, web page 200 is configured to show categories 202 related to human resource information.

Web page 200 shows categories 202 listed across a top of web page 200. In the illustrated example, categories 202 include category 202a "Time," 202b "Tax", 202c "Staffing," 202d "Core," 202e "HR," 202f "Talent," 202g "Payroll," and 202h "Benefits." Categories 202 comprise a broad category of APIs that are directed to human resource functions. In other embodiments, other categories are possible. Categories 202 are static (e.g., do not change) in this example.

List 204 shows a plurality of sub-categories 206 in cards 208. Cards 208 are arranged in a grid pattern. In other embodiments, cards 208 may be arranged to fit within the dimensions of web page 200.

Categories 202 may be color-coded such that each one of category 202 has a different color based on categorization tags 124 (FIG. 1). Each corresponding sub-category has a color matching the parent category, which is displayed in categories 202.

FIG. 3 is an illustration of a web page depicted in accordance with an illustrative embodiment. In this illustrated example, web page 200 shows category 202a as being selected. In response to the selection of category 202a, list 300 shows sub-categories 302a "Time Off," 302b "Time Entry," and 302c "Time Notification," each in respective individual cards, card 304a, card 304b, and card 304c.

Each card includes information about the respective sub-category 302. For example, card 304a includes heading 306 indicating the general description of the category and at least a portion of detailed description 308. Each card also includes button 310 to view APIs directed to the sub-category 302.

FIG. 4 is an illustration of a web page depicted in accordance with an illustrative embodiment. In this illustrated example, web page 200 shows sub-category 302a "Time Off" as being selected. In response to the selection of button 310 of card 310a, both shown in FIG. 3, web page 200 shows list 400. List 400 may show APIs as hyperlinks.

List 400 may be sorted based on popularity of each API 402a-402g in list 400. For example, API 402a may have a higher relevancy score than API 402b.

Figure 5:
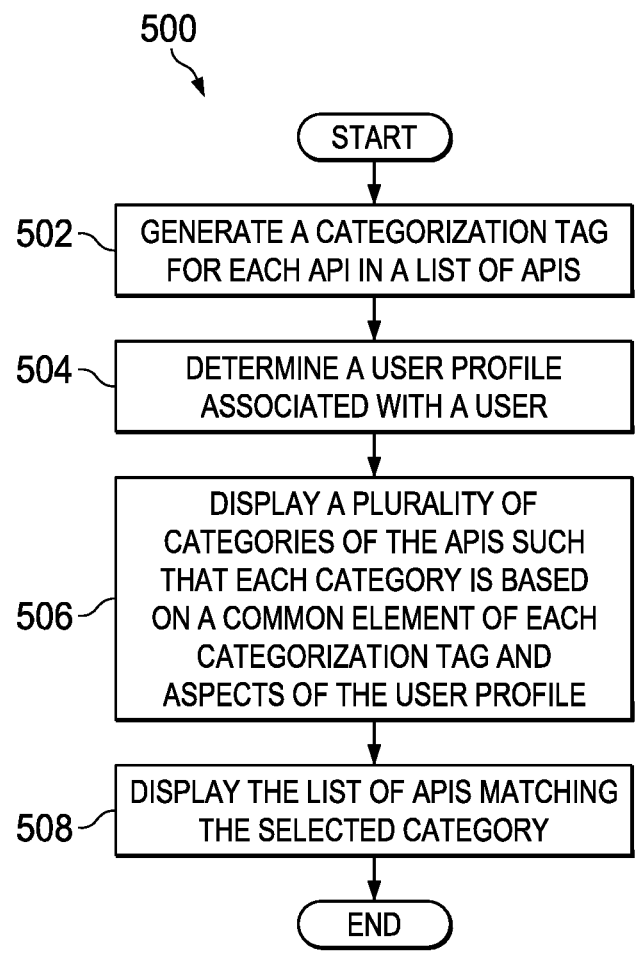
FIG. 5 is an illustration of a flowchart of a computer-implemented method for improving speed of computers that present a list of application-programming interfaces depicted in accordance with an illustrative embodiment.

Turning next to FIG. 5, an illustration of a flowchart of a computer-implemented method for improving speed of computers that present a list of APIs is depicted in accordance with an illustrative embodiment. The process of FIG. 5 may be implemented in development environment 100 shown in FIG. 1.

The process begins by generating a categorization tag for each API in a list (step 502). The categorization tag identifies functions provided by the API. The process then determines a user profile associated with a user (step 504). The user may be the user that develops a web-based application for human resource management. The user may use a web browser from a client computer to access information on a server. The APIs may be listed on the browser.

The process then displays a plurality of categories of the APIs such that each category is based on a common element of each categorization tag and aspects of the user profile (step 506). APIs having sharing features in the categorization tags are grouped into categories.

In response to a selection of one selected category in the plurality of categories, the process displays the list of APIs matching the selected category (step 508). The list is ordered such that APIs having a greater relevance score are presented at a top of the list.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram. For example, the process in FIG. 5 may also display other information in addition to API list shown in the web page.

Figure 6:
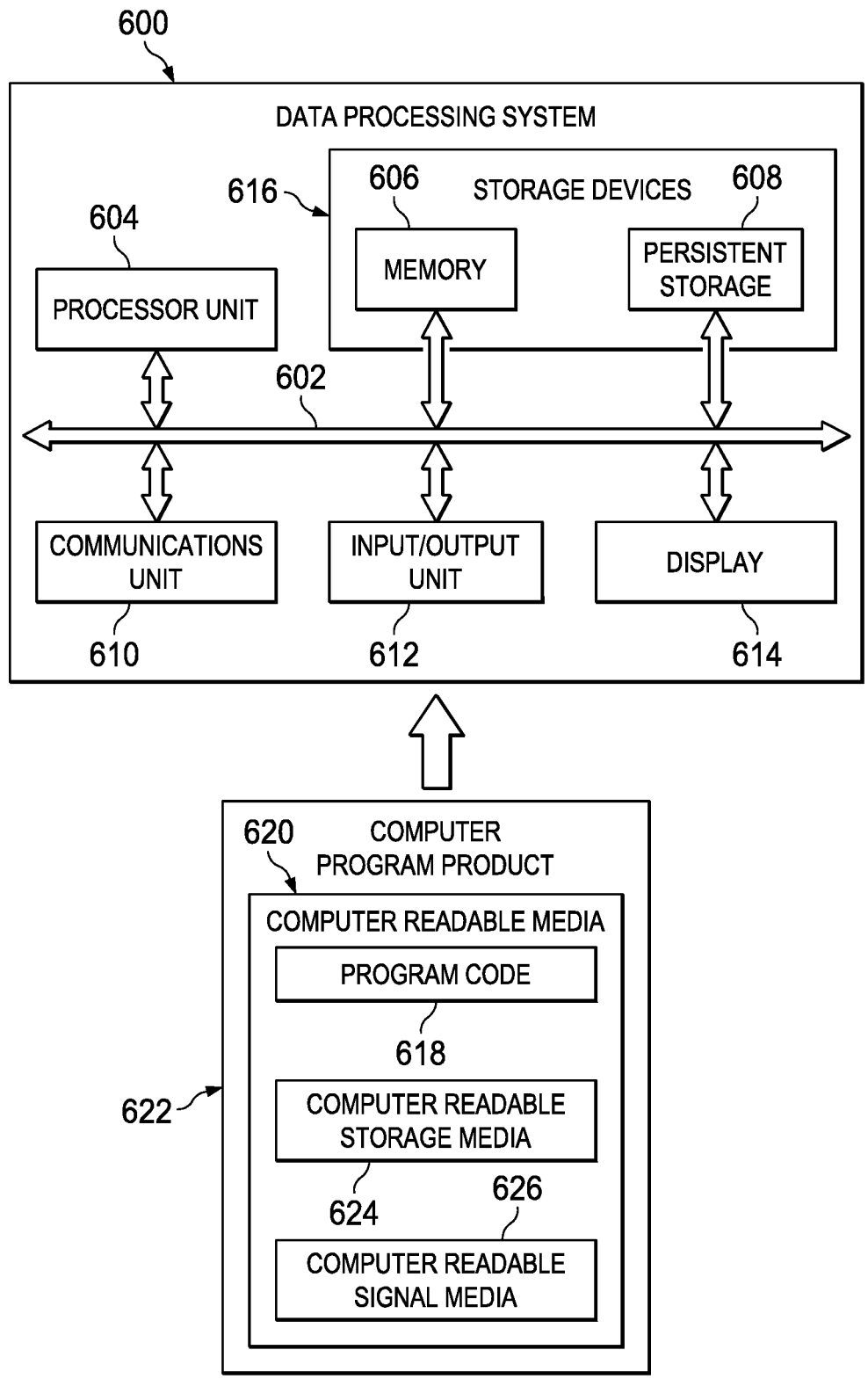
FIG. 6 is an illustration of a block diagram of a data processing system depicted in accordance with an illustrative embodiment.

Turning now to FIG. 6, an illustration of a block diagram of a data processing system is depicted in accordance with an illustrative embodiment. Data processing system 600 may be used to implement client computer 104 or server computer 106 shown in FIG. 1. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626. In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of improving speed of computers that present a list of application programming interfaces (APIs), the method comprising:
   one or more processors;
   generating a categorization tag for each API in a list of APIs, wherein the categorization tag identifies functions provided by the API, wherein the categorization tags record job role of one or more users to identify a trend in a type of job role that users have;
   determining a user profile associated with a user of the one or more users;
   dynamically updating each categorization tag based on user usage of a respective API and user association with the respective API, wherein each categorization tag records the user profile to track information about a user and an API type and wherein each categorization tag creates an association between aspects of the user profile including one or more of job role and API usage type and the respective API, wherein the categorization tag simultaneously associate the API with multiple ones of categories and sub-categories within a hierarchy of categories at any given time;
   displaying a plurality of categories of the APIs such that each category is based on a common element of each categorization tag and aspects of the user profile, wherein the common element of the categorization tag placed in a common bins;
   calculating a relevance score based on the user profile, wherein the relevance score for each API is calculated using a page count for the other user profiles having a same job role; and
   in response to a selection of one selected category in the plurality of categories, displaying the list of APIs matching the one selected category, wherein the list of APIs is ordered such that APIs having a greater relevance score are presented at a top of the list of APIs.

2. The method of claim 1, wherein the categorization tag tracks aspects of other user profiles that have selected the API including one or more of job role or API usage type.

3. The method of claim 2, wherein the aspects of other user profiles comprise one or more of a job role or an API usage type.

4. The method of claim 2, wherein the aspects of the user profile comprises a job role, and wherein a relevance score for each API is calculated using a page count for the other user profiles having a same job role.

5. The method of claim 1, wherein the aspects of the user profile comprises a page count representing a number of times the user has selected a particular API.

6. The method of claim 1, wherein the plurality of categories is color-coded such that each category has a different color based on the categorization tag.

7. The method of claim 1 further comprising:
   in response to the selection of one selected category, displaying a set of sub-categories that are a subset of the one selected category, wherein sub-categories of the set of sub-categories are based on an API type of the one selected category.

8. The method of claim 1, wherein APIs of the list of APIs provide services for a web page comprising one or more of employment information, payroll information, a job type, or a job classification.

9. The method of claim 1, wherein the list of APIs is displayed as hyperlinks.

10. The method of claim 1 further comprising:
    tracking an API usage count that is incremented when the user implements a particular API.

11. A system for listing application programming interfaces (APIs), the system comprising:
    a processor configured such that, in operation, the processor executes code to implement:
      a login manager that retrieves a user profile associated with a user; and a data processing component configured to:
        generate a categorization tag for each API in a list of APIs, wherein the categorization tag identifies functions provided by the API, wherein the categorization tags record job role of one or more users to identify a trend in a type of job role that users have;
        dynamically update each categorization tag based on user usage of a respective API and user association with the respective API, wherein each categorization tag records the user profile to track information about a user and an API type and wherein each categorization tag creates an association between aspects of the user profile including one or more of job role or API usage type and the respective API, wherein the categorization tag simultaneously associate the API with multiple ones of categories and sub-categories within a hierarchy of categories at any given time;
        display a plurality of categories of the APIs such that each category is based on a common element of each categorization tag and aspects of the user profile, wherein the common element of the categorization tag placed in a common bins;
        detect a selection of one selected category in the plurality of categories;
        calculating a relevance score based on the user profile, wherein the relevance score for each API is calculated using a page count for the other user profiles having a same job role; and
        in response to the selection of one selected category, display the list of APIs matching the one selected category, wherein the list of APIs is ordered such that the APIs having a greater relevance score based on the user profile are presented at a top of the list of APIs.

12. The system of claim 11, wherein the categorization tag tracks aspects of other user profiles that have selected the API including one or more of job role or API usage type.

13. The system of claim 12, wherein the aspects of other user profiles comprise one or more of a job role or an API usage type.

14. The system of claim 12, wherein the aspects of the user profile comprises a job role, and wherein a relevance score for each API is calculated using a page count for the other user profiles having a same job role.

15. The system of claim 11, wherein the aspects of the user profile comprises a page count representing a number of times the user has selected a particular API.

16. The system of claim 11, wherein the plurality of categories is color-coded such that each category has a different color based on the categorization tag.

17. The system of claim 11, wherein the data processing component is further configured such that in response to the selection of one selected category, the data processing component displays a set of sub-categories that are a subset of the one selected category, wherein sub-categories of the one selected category are based on an API type of the one selected category.

18. The system of claim 11, wherein APIs of the list of APIs provide services for a web page comprising one or more of employment information, payroll information, a job type, or a job classification.

19. The system of claim 11, wherein the data processing component is further configured such that in operation the data processing component tracks an API usage count that is incremented when the user implements a particular API.

20. The system of claim 11, wherein the system generates a web page that processes and displays human resource information.

21. A computer program product, comprising:
a non transitory computer-readable storage media comprising instructions, which when executed by a processor, improves speed of the processor presenting a list of application programming interfaces (APIs), the instructions comprising:
first program code implementing a login manager that retrieves a user profile associated with a user; and
second program code implementing a data processing component that:
generates a categorization tag for each API in a list of APIs, wherein the categorization tag identifies functions provided by the API, wherein the categorization tags record job role of one or more users to identify a trend in a type of job role that users have;
dynamically updates each categorization tag based on user association with a respective API and user usage of the respective API, wherein each categorization tag records the user profile to track information about a user and an API type and wherein each categorization tag creates an association between aspects of the user profile including one or more of job role or API usage type and the respective API, wherein the categorization tag simultaneously associate the API with multiple ones of categories and sub-categories within a hierarchy of categories at any given time;
displays a plurality of categories of the APIs such that each category is based on a common element of each categorization tag and aspects of the user profile, wherein the common element of the categorization tag placed in a common bins;
detects a selection of one selected category in the plurality of categories;
calculating a relevance score based on the user profile, wherein the relevance score for each API is calculated using a page count for the other user profiles having a same job role; and
in response to the selection of one selected category, displays the list of APIs matching the one selected category, wherein the list of APIs is ordered such that the APIs having a greater relevance score based on the user profile are presented at a top of the list of APIs.

22. The computer program product of claim 21, wherein the categorization tag tracks aspects of other user profiles that have selected the API including one or more of job role or API usage type.

23. The computer program product of claim 22, wherein the aspects of other user profiles comprise one or more of a job role or an API usage type.

24. The computer program product of claim 22, wherein the aspects of the user profile comprise a job role, and wherein a relevance score for each API is calculated using a page count for the other user profiles having a same job role.

* * * * *